United States Patent
Wybenga et al.

(10) Patent No.: US 7,212,537 B2
(45) Date of Patent: May 1, 2007

(54) APPARATUS AND METHOD FOR RECOVERING COMMUNICATION SESSIONS IN A WIRELESS NETWORK GATEWAY

(75) Inventors: Jack C. Wybenga, Plano, TX (US); Pradeep Samudra, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 1048 days.

(21) Appl. No.: 10/192,667

(22) Filed: Jul. 10, 2002

(65) Prior Publication Data

US 2004/0008649 A1 Jan. 15, 2004

(51) Int. Cl.
*H04L 12/28* (2006.01)

(52) U.S. Cl. .................. 370/401; 370/352; 370/217; 370/338

(58) Field of Classification Search .............. None
See application file for complete search history.

(56) References Cited

U.S. PATENT DOCUMENTS

| | | | |
|---|---|---|---|
| 6,748,247 B1 * | 6/2004 | Ramakrishnan et al. .... | 455/574 |
| 6,834,050 B1 * | 12/2004 | Madour et al. ............. | 370/392 |
| 7,035,657 B2 * | 4/2006 | Chen et al. .................. | 455/518 |
| 2002/0145990 A1 * | 10/2002 | Sayeedi ....................... | 370/335 |
| 2002/0167905 A1 * | 11/2002 | Wenzel et al. .............. | 370/249 |
| 2003/0053431 A1 * | 3/2003 | Madour ....................... | 370/331 |
| 2003/0076804 A1 * | 4/2003 | Sivalingham ............... | 370/338 |
| 2003/0145091 A1 * | 7/2003 | Peng et al. ................. | 709/229 |
| 2004/0008728 A1 * | 1/2004 | Lee ............................ | 370/474 |

* cited by examiner

*Primary Examiner*—Duc Ho

(57) ABSTRACT

A wireless network gateway for transmitting data between a wireless network and a packet data network. The wireless network gateway comprises: 1) N input-output processors for transmitting and receiving data packets to and from the wireless network and the packet data network; 2) M service processors for performing packet data serving node (PDSN) functions associated with data sessions between the packet data network and mobile stations communicating with the wireless network; 3) a switch fabric for the N input-output processors and the M service processors; and 4) P switch modules. Each of the P switch modules transfers data packets between the switch fabric and at least one input-output processors. A first switch module stores session bindings information associated with a first data session between a first mobile station and the packet data network.

24 Claims, 5 Drawing Sheets

APPARATUS AND METHOD FOR RECOVERING COMMUNICATION SESSIONS IN A WIRELESS NETWORK GATEWAY

TECHNICAL FIELD OF THE INVENTION

The present invention is directed, in general, to massively parallel routers and, more specifically, to a protocol recovery mechanism for use in a loosely coupled massively parallel router.

BACKGROUND OF THE INVENTION

A packet data serving node (PDSN) provides packet data services that support high-speed two-way data communications in wireless networks. The new 3G networks that are now being developed and deployed utilize Simple IP and Mobile IP to allow a mobile subscriber to use a mobile station (e.g. personal computer (PC), personal digital Assistant (PDA), web browsing cell phone) transparently, whether the subscriber is accessing information on a corporate LAN, the Internet or other IP-based network. A PDSN provides these capabilities to the wireless network.

In particular, 3G packet data serving node provides users with the following:

1) Two-way mobile communications utilizing packet segmentation of the user data stream;

2) Mobile IP or Simple IP to data networks such as the Internet, corporate Intranets and Extranets;

3) Secure access to corporate data networks;

4) Transport for support of all applications available to the user over corporate networks and public services such as the Internet; and 5) Raw data rates from 1.2 Kbps to 153.6 Kbps to over 1 Mbps as 3G evolves.

The PDSN is a network element whose primary function is interworking 3G wireless mobile packet sessions with other IP packet data networks (e.g., the Internet). A PDSN performs two basic functions: 1) the exchange of packets with the mobile station over the radio network and 2) the exchange of packets with other IP networks. To perform these functions, the PDSN interfaces with the base station controller (BSC), the Authentication Authorization and Accounting (AAA) servers, Home Agent servers, and packet data networks.

The PDSN communicates to the mobile station (MS) using a point-to-point protocol (PPP) session originated by the mobile station. The PDSN must also communicate with the radio network (i.e., BSC) during handoffs to maintain the PPP session. While the mobile station is exchanging information, the PDSN collects accounting information, which it forwards to an AAA server. It also interacts with the AAA server to receive user profiles to authenticate the mobile user. When Mobile IP is supported in a wireless network, the PDSN performs the necessary Foreign Agent functions to communicate with Home Agents to locate and authenticate mobile users. This includes establishing a secure tunnel to Home Agents for receiving and sending subscriber information.

The PDSN provides the following functions in a typical 3G wireless network architecture:

1) Terminating PPP sessions and forwarding IP packets to the Packet Data Network (PDN);

2) Facilitating Mobile IP session operating as a Foreign Agent (FA);

3) Maintaining communication with the Home Agent (HA) by keeping IP sessions active when mobile users move from a first cell serviced by a first PDSN to a second cell serviced by a second PDSN;

4) Supporting the user Authentication Authorization and Accounting (AAA) services by collecting this information and forwarding it to the appropriate end device and terminating the connection upon authentication failure;

5) Supporting static and dynamic IP addressing schemes;

6) Supporting Simple IP and Mobile IP protocols; and

7) Supporting Virtual Private Networking (VPN).

For a variety of reasons, however, session information associated with a data session can be lost by a failure of a network element. In particular, a failure of a PDSN service processor located in a wireless network gateway router can cause all session information associated with a data call to be lost. This decreases network reliability and increase use of network resources as a subscriber reconnects to the wireless network and reestablishes a session with a network server via a PDSN.

Therefore, there is a need in the art for an improved packet data serving nodes for use in wireless networks. In particular, there is a need for a massively parallel router having a distributed architecture that implements an efficient apparatus and method for recovering a communication session in a wireless network gateway.

SUMMARY OF THE INVENTION

To address the above-discussed deficiencies of the prior art, it is a primary object of the present invention to provide a wireless network gateway capable of bidirectionally transmitting data between a wireless network and a packet data network associated with the wireless network. According to an advantageous embodiment of the present invention, the wireless network gateway comprises: 1) N input-output processors capable of receiving data packets from, and transmitting data packets to, the wireless network and the packet data network; 2) M service processors capable of performing packet data serving node (PDSN) functions associated with data sessions between the packet data network and mobile stations communicating with the wireless network; 3) a switch fabric capable of bidirectionally coupling the N input-output processors and the M service processors; and 4) P switch modules, each of the P switch modules capable of bidirectionally transferring data packets between the switch fabric and at least one of the N input-output processors, wherein a first one of the P switch modules stores session bindings information associated with a first data session between a first mobile station and the packet data network.

According to one embodiment of the present invention, the wireless network gateway in response to a failure of a first service processor performing PDSN functions associated with the first data session, the first switch module is capable of using the stored session bindings information to configure a second service processor to continue to perform the PSDN functions associated with the first data session.

According to another embodiment of the present invention, the first switch module transfers data packets between the switch fabric and a first input-output processor that receives data packets from, and transmits data packets to, the first mobile station.

According to still another embodiment of the present invention, the first switch module is capable of receiving from the wireless network an initial registration request message associated with the first mobile station requesting to initiate the first data session.

According to yet another embodiment of the present invention, the first switch module, in response to the initial registration request message, transmits to the wireless network a registration reply message denying the initial registration request message requesting to initiate the first data session.

According to a further embodiment of the present invention, the first switch module further transmits to the wireless network an address the first service processor performing the PDSN functions associated with the first data session.

According to a still further embodiment of the present invention, the first switch module is further capable of receiving from the wireless network a subsequent registration request message associated with the first mobile station directed to the first service processor requesting to initiate the first data session with the first service processor.

According to a yet further embodiment of the present invention, the first switch module is further capable of forwarding the subsequent registration request message to the first service processor.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Furthermore, the following definitions apply to the particular wireless Internet protocol (IP) terms and acronyms used in the Detailed Description of the Invention that follows:

R-P Session—A Radio Network-to-Packet Data Network (R-P) session is a logical connection established over the R-P interface for a particular Point-to-Point Protocol (PPP) session. If a user changes radio networks during a packet data service session, the R-P session is moved from the old radio network to the new radio network, but is still connected to the same packet data serving node (PDSN). If the user changes to a new PDSN during a packet data service session, a new R-P session is established and the previous R-P session is released.

PPP Session—A Point-to-Point Protocol (PPP) session describes the time during which a particular PPP connection instance is maintained in the open state in both the mobile station and the corresponding PDSN. The PPP session is maintained during periods when the mobile station is dormant. If a mobile station is handed-off from one radio network to another radio network but is still connected to the same PDSN, the PPP session remains. If a user changes to a new PDSN, a new PPP session is created at the new PDSN.

AAA Server—An Authentication, Authorization, Accounting (AAA) is a server that processes mobile station authentication requests from the PDSN. An AAA server has different responsibilities, depending on whether the AAA server is acting on requests from mobile stations in a home network, a service provider network, or a broker network. An AAA server also receive Airlink accounting records from PDSNs. A detailed description of AAA server functions can be found in reference PN-4286-A (TIA/EIA/TSB-115)—Wireless IP Architecture based on IETF Protocols, Jun. 6, 2000.

Packet Data Session—A packet data session describes an instance of use of packet data service by a mobiles station. A packet data session begins when the mobiles station invokes a packet data service. A packet data session ends when the mobile station or the wireless network terminates the packet data service. During a particular packet data session, the user may change locations but the same IP address is maintained. For Simple IP service, moving from the coverage area of one PDSN to another PDSN constitutes a change in a packet data session. For Simple IP service, a packet data session and a PPP session occur at the same time. For Mobile IP service, a packet data session can span several PDSNs as long as the user continuously maintains mobility bindings at the Home Agent and there is no lapse in Mobile IP registration or re-registration.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network gateway.

Figure 1:
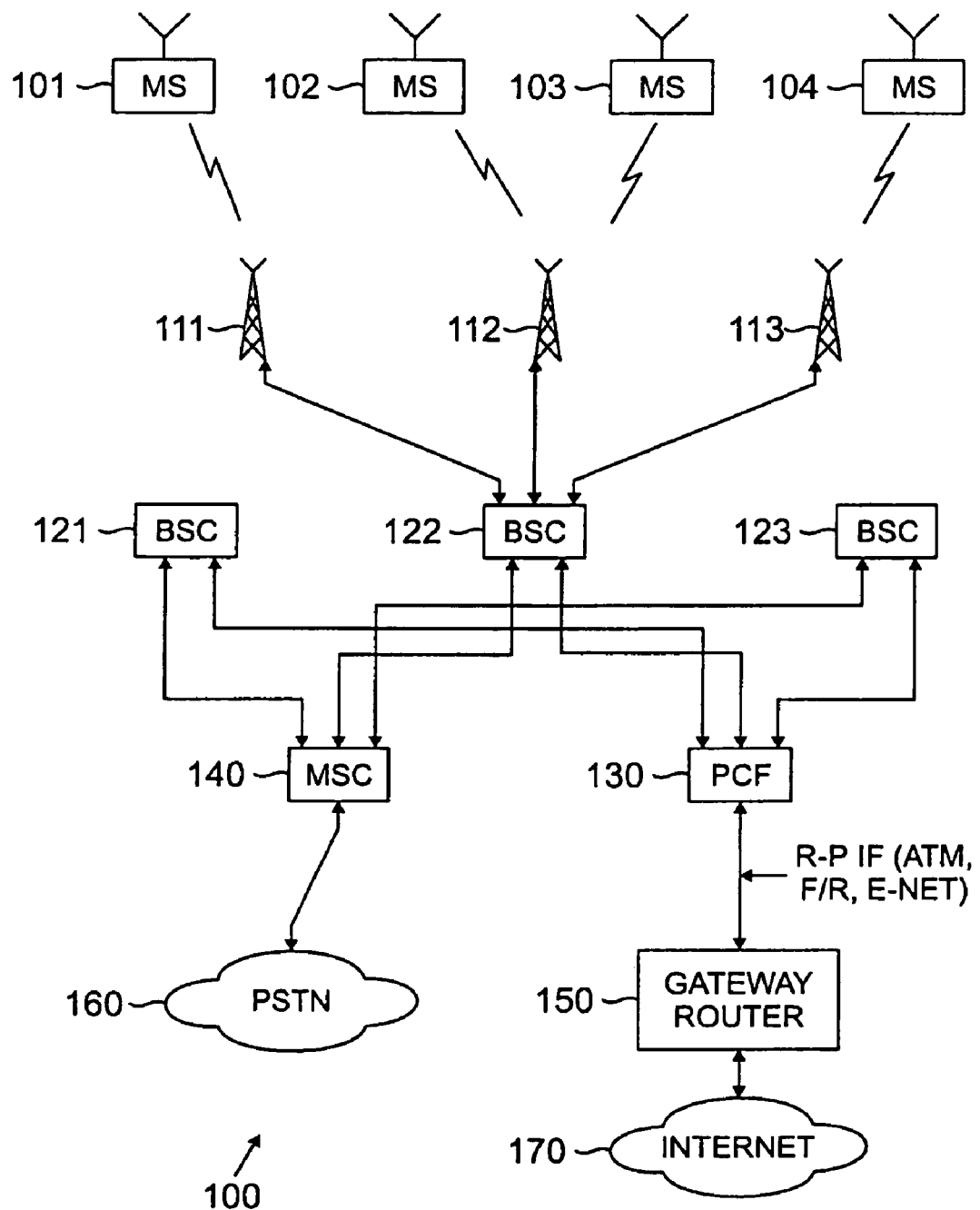
FIG. 1 illustrates an exemplary communication network using a wireless network gateway router according to the principles of the present invention.

FIG. 1 illustrates exemplary communication network 100, which implements wireless network gateway router 150 according to the principles of the present invention. Communication network 100 comprises a plurality of base transceiver subsystems, including exemplary base transceiver subsystem (BTS) 111, BTS 112, and BTS 113. The base transceiver subsystems communicate wirelessly with a plurality of wireless terminals, including mobile stations 101–104, which are located in the coverage areas of BTS 111–113.

The wireless network portion of communication network 100 also comprises a plurality of base station controllers, including exemplary base station controller (BSC) 121, BSC 122, and BSC 123. BTS 111–113 are coupled to and controlled by base station controller 122. Each one of BSC 121, BSC 122 and BSC 123 transmits voice data to, and receives voice data from, public switched telephone network (PSTN) 160 via mobile switching center (MSC) 140. Also, each one of BSC 121, BSC 122 and BSC 123 transmits packet data to, and receives packet data from, the public Internet 170 (or a similar Internet protocol (IP) based network) via packet control facility (PCF) 130 and gateway router 150.

In alternate embodiments, PCF 130 may be integrated into BSC 122. The operation of BSC 122 and PCF 130 is well known by those skilled in the art and has been well-defined in telecommunication standards, including the TIA/EIA/IS-2001 standard. The connection between PCF 130 to gateway router 150 comprises the Radio Network-to-Packet Data Services Network (R-P) interface (IF). The R-P interface comprises the A10 and A11 interfaces defined in the TIA/EIA/IS-2001 standard. The A10 interface transfers mobile data bidirectionally between the wireless network and the packet data network. The A11 interface comprises the control signaling for the R-P sessions. The R-P interface may include one or more of asynchronous transfer mode (ATM) links, frame relay (FR) links, and Ethernet links, among others.

Figure 2:
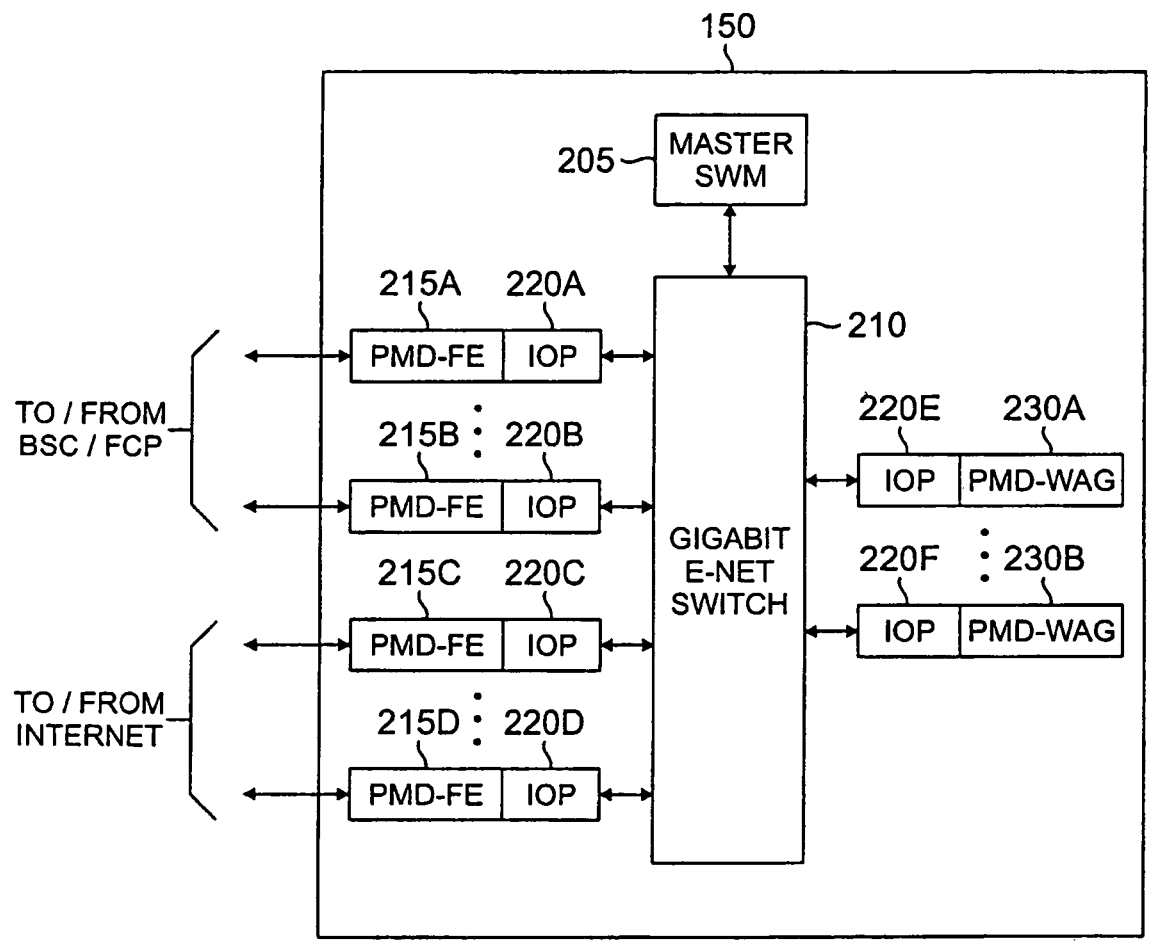
FIG. 2 is a high level block diagram of the wireless network gateway router according to an exemplary embodiment of the present invention.

FIG. 2 is a high level block diagram of wireless network gateway router 150 according to an exemplary embodiment of the present invention. Gateway router 150 is a massively parallel distributed router comprising master switch module (SWM) 205, gigabit Ethernet (E-Net) switch fabric 210, and a plurality of physical media devices (PMD) 215 with forwarding engines (FE), including exemplary PMD-FE 215A, PMD-FE 215B, PMD-FE 215C, and PMD-FE 215D. According to one embodiment of the present invention, each one of PMD-FE 215A, PMD-FE 215B, PMD-FE 215C, and PMD-FE 215D frames an incoming packet (or cell) from an IP network (or ATM switch) to be processed in an input-output processor (IOP) and performs bus conversion functions.

Gateway router 150 also comprises a plurality of input-output processors (IOPs), including exemplary IOP 220A, IOP 220B, IOP 220C, IOP 220D, IOP 220E, and IOP 220F. Each one of IOP 220A, IOP 220B, IOP 220C, IOP 220D, IOP 220E, and IOP 220F buffers incoming Internet protocol (IP) packets from subnets or adjacent routers. Each one of IOP 220A, IOP 220B, IOP 220C, IOP 220D, IOP 220E, and IOP 220F also classifies requested services, looks up destination addresses from packet headers, and forwards packet to the outbound IOP.

Finally, gateway router 150 comprises a plurality of physical media device-wireless access gateway (PMD-WAG) service processors 230, including exemplary PMD-WAG service processors 230A and 230B. PMD-WAG service processors 230 process the R-P sessions and the corresponding point-to-point protocol (PPP) sessions, including compression and encryption requirements.

Figure 3:
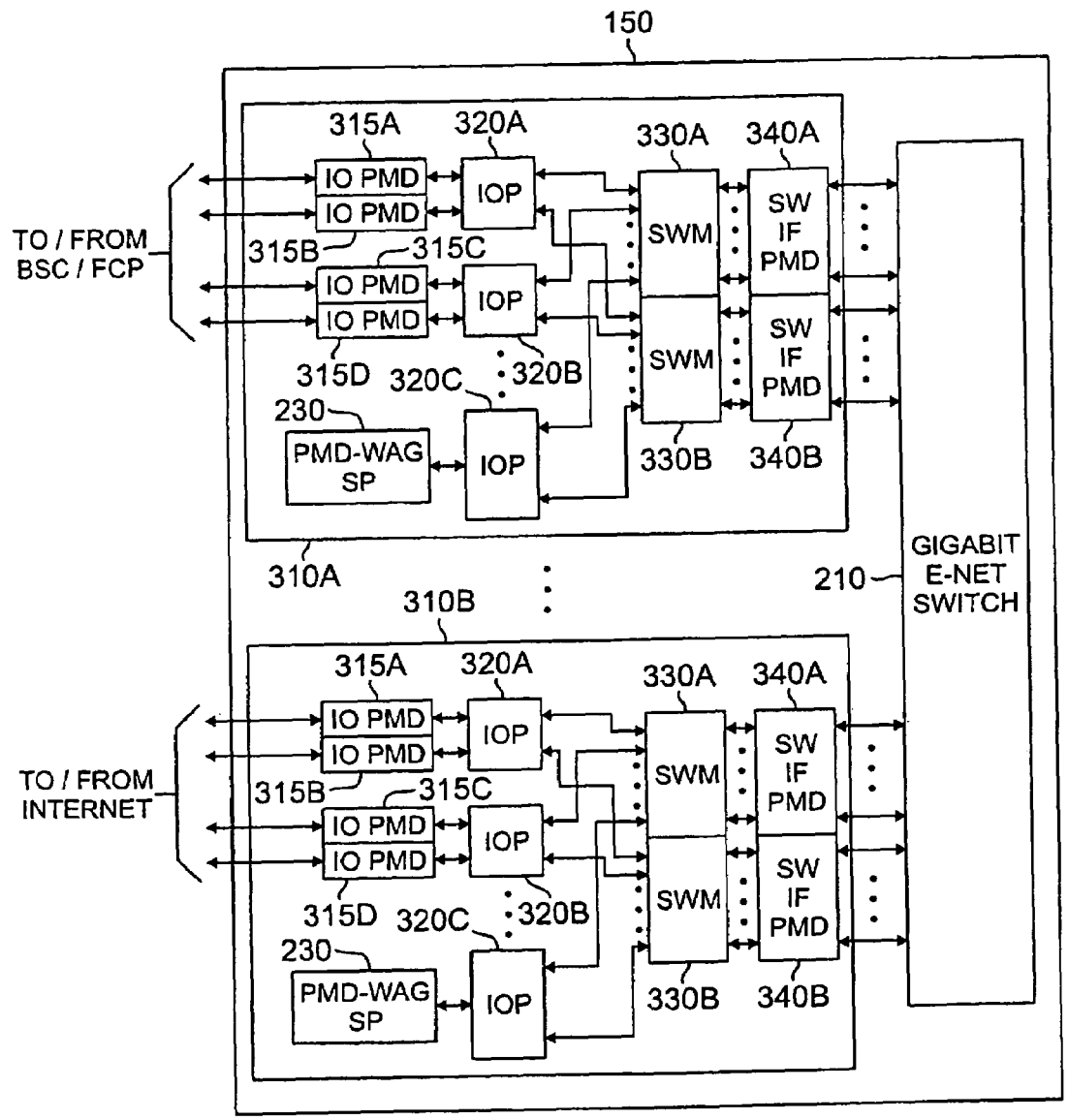
FIG. 3 is a detailed block diagram of the wireless network gateway router according to an exemplary embodiment of the present invention.

FIG. 3 is a detailed block diagram of wireless network gateway router 150 according to an exemplary embodiment of the present invention. Gateway router 150 comprises a plurality of racks 310, including exemplary racks 310A and 310B. The racks 310 are coupled to one another by gigabit Ethernet switch fabric 210. Exemplary rack 310A comprises a plurality of input-output physical media devices 315, including exemplary input-output physical media device (IO PMD) 315A, IO PMD 315B, IO PMD 315C, and IO PMD 315D. Each IO PMD 315 is coupled to one of a plurality of input-output processors 320, including exemplary input-output - processor (IOP) 320A, IOP 320B, and IOP 320C. Input-output processors 320 are equivalent to input-output processors 220 in FIG. 2. Input-output physical media devices 315 are equivalent to PMD-FE 215A-PMD-FE 215D in FIG. 2.

Gateway router 150 also comprises two switch modules 330, namely switch module (SWM) 330A and SWM 330B, one of which functions as a master switch module. Gateway router 150 further comprises two switch interface physical media devices 340, namely switch interface physical media device (SW IF PMD) 340A and SW IF PMD 340B, and at least one PMD-WAG service processor (SP) 230.

According to an exemplary embodiment of the present invention, gateway router 150 may comprise up to thirty-eight (38) input-output processors 320, many of which are coupled to two (2) input-output physical media devices 315 by separate 64-bit IX buses. At least one IOP 320 is coupled to at least one PMD-WAG service processor (SP) 230 by a 64-bit IX bus. Each IO PMD 315 has up to eight (8) ports for bidirectionally transferring packet data with external devices according to one or more protocols, including 10/100 Ethernet connections. According to the advantageous embodiment, each IOP 320 is coupled to SWM 330A by a first 1 Gbps full duplex connection and to SWM 330B by a second 1 Gbps full duplex connection.

SWM 330A is further coupled to SW IF PMD 340A by up to four 10 Gbps electrical connections and SWM 330B is coupled to SW IF PMD 340B by up to four 10 Gbps electrical connections. Finally, SW IF PMD 340A is coupled to Gigabit Ethernet switch fabric 210 by up to four 10 Gbps optical connections and SW IF PMD 340B is coupled to Gigabit Ethernet switch fabric 210 by up to four 10 Gbps optical connections.

The remaining racks 310 of gateway router 150, including rack 310B, are functionally identical to rack 310A and need not be described in further detail.

Gateway router 150 takes advantage of the distributed, massively parallel routing architecture and the error recovery mechanisms in the base router design. This design implements support for the R-P and PPP protocols in the PMD-WAG service processor 230 and utilizes the master switch module (SWM) 330 for resource allocation and error (failure) recovery. The R-P and PPP sessions are distributed across the one or more PMD-WAG service processors 230 by the master SWM 330.

Gateway router 150 treats PMD-WAG service processors 230 as a family of parallel packet data serving nodes (PDSNs). R-P/PPP sessions are allocated to PMD-WAG service processors 230 in a round robin fashion, except where an active binding already exists and is reassigned to the previous PMD-WAG service processor 230 where the session existed previously. This architecture for resource allocation and assignment ensures the elimination of ghost sessions within gateway router 150 and the ability to recover from hardware or software failures while providing the capacity to handle the required traffic. R-P and PPP sessions are routed to the assigned PMD-WAG service processor 230. Each PMD-WAG service processor 230 processes the R-P and PPP protocols and forwards the resulting IP packets back to the corresponding IOP 230, where the IOP 230 native routing functionality routes the traffic.

Each PMD-WAG service processor 230 acts as an independent PDSN managed by the master SWM 330 within a single logical PDSN that is connect to the wireless network portion of communication network 100. The published IP address of the PDSN is that of the master SWM 330. Thus, the initial R-P session communication establishing a session between the wireless network and the wireless access gateway router 150 is always with the master SWM 330. The master SWM 330 keeps track of the binding information that identifies the mobile station (MS) and re-directs the session to one of the PMD-WAG service processors 230. The master SWM 330 uses a round robin algorithm to allocate the mobile station R-P and PPP sessions. In the event the MS binding is already known to the master SWM 330, the master SWM 330 directs the session back to the PMD-WAG service processor 230 that last managed the session.

Advantageously, since the master SWM 330 maintains and updates a redundant copy of all of the mobile station (MS) binding information for each mobile station, if a PMD-WAG service processor 230 providing services to a particular mobile station fails, the communication session can still be saved. Since the master SWM 330 contains all of the MS binding information, master SWM 330 can transfer the MS binding information to a new PMD-WAG service processor 230, which then resumes the communication session in place of the failed PMD-WAG service processor 230.

An All R-P session registration message comes into the wireless access gateway router 150 from the wireless network via PCF 130 and is addressed to the master switch module (SWM) 330. The master SWM 330 responds with a Registration-Denial message and the IP address of an available PMD-WAG service processor 230. The wireless network responds with another registration request sent to the assigned PMD-WAG service processor 230. The assigned PMD-WAG service processor 230 establishes an R-P session with the wireless network. Next, the mobile station negotiates a PPP session with the assigned PMD-WAG service processor 230.

The assigned PMD-WAG service processor 230 then performs AAA (Authentication, Authorization, and Accounting) functions and subsequent data compression and/or encryption for the on-going session. Thus, the assigned PMD-WAG service processor 230 receives PPP packets from the mobile station and forwards the resulting IP packet(s) to the appropriate IOP 320 for routing to Internet 170. The PMD-WAG service processor 230 receives IP packets from internet 170 from an IOP 320 and converts the packets to PPP messages that are forwarded to the correct IOP card for routing to the mobile station.

The link layer/network layer frames pass over the A10 connection between PCF 130 and wireless access gateway router 150 in both directions via, for example GRE framing. Gateway router 150 accepts the frames, strips the GRE header, and processes them as normal incoming frames for the appropriate interface and protocol. Packets traveling in the reverse direction are processed in the reverses manner, with wireless access gateway router 150 encapsulating the link layer/network layer data packets in GRE frames and PCF 130 stripping the GRE header before passing the frames over to the upper layer. At this point, there is a point-to-point link layer/network layer connection between the mobile station and wireless access gateway router 150.

Figure 4:
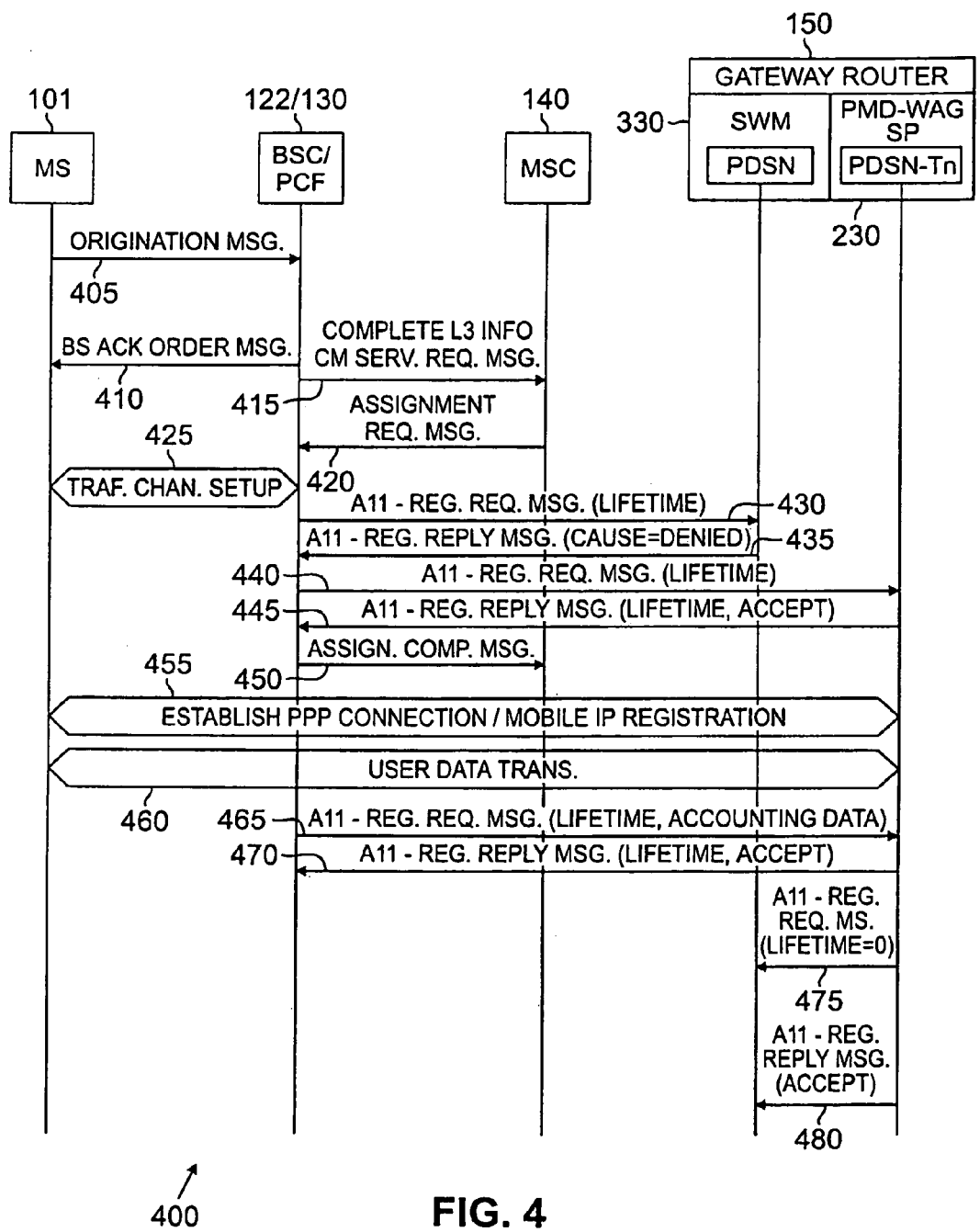
FIG. 4 is a message flow diagram illustrating the operation of the wireless network gateway router according to an exemplary embodiment of the present invention.

FIG. 4 depicts message flow diagram 400, which illustrates the operation of wireless network gateway router 150 according to an exemplary embodiment of the present invention. FIG. 4 shows a mobile station-originated packet call setup. The message sequence in FIG. 4 is utilized by wireless access gateway router 150 to establish every R-P and PPP session. This approach allows the incoming MS sessions to be distributed across the PMD-WAG service processors 230. Only the R-P messages used to setup and close a session with wireless access gateway 150 are detailed below (see TIA/EIA/IS-2001 for a description of the other messages).

Initially, a mobile station (i.e., MS 101) begins a packet data call by transmitting an Origination message 405 to BSC 122 (and PCF 130) via BTS 111. BSC 122 responds by transmitting a Base Station Acknowledgment (BS ACK) order message 410 back to MS 101. BSC 122 also transmits the complete L3 information for the call to MSC 140 in a CM Service Request message 415. MSC 140 responds by transmitting Assignment Request message 420 back to BSC 122, thereby assigning wireless network resources to the packet data call. Thereafter, MS 101 and BSC 122 exchange messages (generally designated 425) that set up a traffic channel.

PCF 130 recognizes that no A10 connection associated with mobile station 101 is available and selects a PDSN (i.e., master SWM 330 in wireless access gateway router 150) for the packet data call. In response, PCF 130 sends A11-Registration Request message 430 to the selected PDSN and starts a timer T(RegReq). The A11-Registration Request is validated and the PDSN (master SWM 330) rejects the connection and proposes PDSN-Tn (one of PMD-WAG service processors 230). Master SWM 330 does this by transmitting to PCF 130 an A11-Registration Reply message 435 with a reject code of 88H (i.e., Registration Denied—Unknown PDSN address) and the address of the PDSN-Tn in the Home Agent address field of the A11-Registration Reply message 435. PCF 130 then stops the T(RegReq) timer.

Next, PCF 130 initiates establishment of the A10 connection with the PDSN-Tn (PMD-WAG service processor 230) by sending an A11-Registration Request message 440 to gateway router 150. PCF 130 then starts the timer T(Rreg Req). The A11-Registration Request is validated and the PDSN-Tn (PMD-WAG service processor 230) accepts the connection by returning an A11-Registration Reply message 445 with an "Accept" indication and the Lifetime value set to the configured Trp value. Both the PDSN-Tn (PMD-WAG service processor 230) and PCF 130 create a binding record for the A10 connection. PCF 130 then stops timer T(RegReq).

Thereafter, PCF 130 transmits Assignment Complete message 450 to MSC 140. At this point, PMD-WAG service processor 230, acting as PDSN-Tn, establishes a PPP connection and performs Mobile IP registration (generally designated 455). User data is then transmitted bi-directionally between PMD-WAG service processor 230 and MS 101 (generally designated 460).

The mobile session is closed when PCF 130 transmits A11-Registration Request message 465 (with Accounting data values) to PMD-WAG service processor 230. PMD-WAG service processor 230 responds by transmitting A11-Registration Reply message 470 back to PCF 130.

After the mobile session is closed, PMD-WAG service processor 230 clears the R-P session binding kept by the master SWM 330 by transmitting to the master SWM 330 an A11-R-P Registration Request message 475 in which the Lifetime value is set to zero. The Master SWM 330 responds to PMD-WAG service processor 230 with an A11-Registration Reply message 480, which indicates the mobile binding has been cleared.

Figure 5:
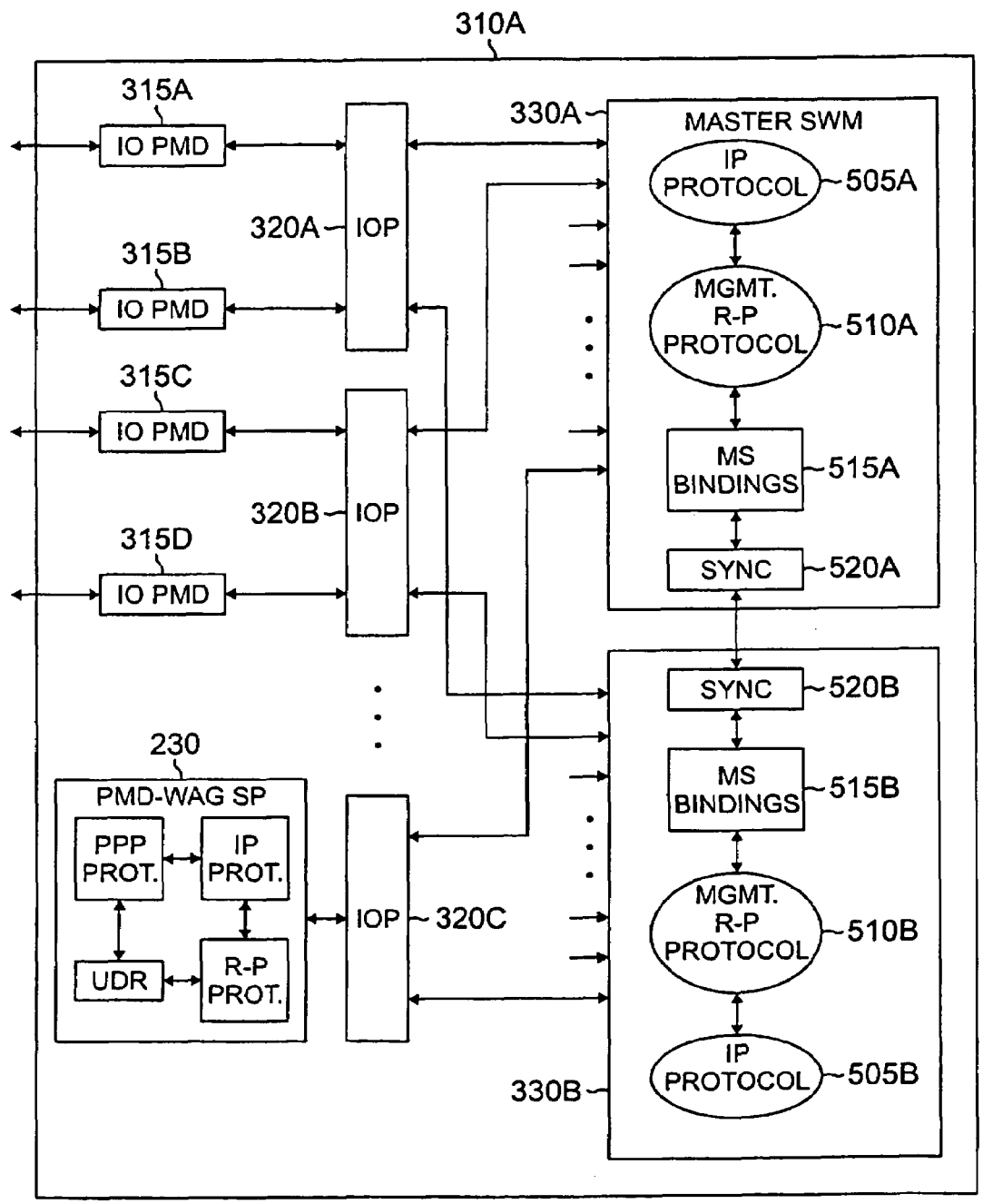
FIG. 5 is a detailed block diagram illustrating selected software modules in the wireless network gateway router according to an exemplary embodiment of the present invention.

FIG. 5 is a detailed block diagram illustrating selected software modules in wireless network gateway router 150 according to an exemplary embodiment of the present invention. A mobile station, via PCF 130, establishes R-P and PPP sessions to communicate with the PDSN in wireless access gateway router 150. The R-P and PPP protocols are performed by software modules running in the PMD-WAG service processor 230. The master SWM 330A manages all PMD-WAG service processors 230. R-P and PPP session management is accomplished through R-P messages (i.e., IP protocol 505, management R-P protocol 510) from the master SWM 330A.

When a mobile station session is terminated, the PMD-WAG service processor 230 informs the master SWM 330A so that the session information can be removed from MS bindings table 515A. Again, the R-P protocol is used to accomplish clearing mobile session entries from the MS bindings table 515A. PMD-WAG service processor 230 generates a R-P registration request with a Lifetime equal to zero, in the same manner that the mobile network ends mobile session with PMD-WAG service processor 230, and forwards the message to master SWM 330A. The mobiles station and PMD-WAG service processor 230 binding data in MS bindings table 515A must remain in synchronization with the corresponding data in redundant backup SWM 330B so that failure of master SWM 330A is recoverable. SYNC software modules 520A and 520B perform the needed synchronization between master SWM 330A and redundant backup SWM 330B.

Although the present invention has been described in detail, those skilled in the art should understand that they may make various changes, substitutions and alterations herein without departing from the spirit and scope of the invention in its broadest form.

What is claimed is:

1. A wireless network gateway bidirectionally transmitting data between a wireless network and a packet data network associated with said wireless network, said wireless network gateway comprising:
   N input-output processors receiving data packets from, and transmitting data packets to, said wireless network and said packet data network;
   M service processors performing packet data serving node (PDSN) functions associated with data sessions between said packet data network and mobile stations communicating with said wireless network;
   a switch fabric bidirectionally coupling said N input-output processors and said M service processors; and
   P switch modules, each of said P switch modules bidirectionally transferring data packets between said switch fabric and at least one of said N input-output processors, wherein a first one of said P switch modules stores session bindings information associated with a first data session between a first mobile station and said packet data network.

2. The wireless network gateway as set forth in claim 1 wherein, in response to a failure of a first service processor performing PDSN functions associated with said first data session, said first switch module uses said stored session bindings information to configure a second service processor to continue to perform said PSDN functions associated with said first data session.

3. The wireless network gateway as set forth in claim 2 wherein said first switch module transfers data packets between said switch fabric and a first input-output processor that receives data packets from, and transmits data packets to, said first mobile station.

4. The wireless network gateway as set forth in claim 3 wherein said first switch module receives from said wireless network an initial registration request message associated with said first mobile station requesting to initiate said first data session.

5. The wireless network gateway as set forth in claim 4 wherein said first switch module, in response to said initial registration request message, transmits to said wireless network a registration reply message denying said initial registration request message requesting to initiate said first data session.

6. The wireless network gateway as set forth in claim 5 wherein said first switch module further transmits to said wireless network an address of said first service processor performing said PDSN functions associated with said first data session.

7. The wireless network gateway as set forth in claim 6 wherein said first switch module receives from said wireless network a subsequent registration request message associated with said first mobile station directed to said first service processor requesting to initiate said first data session with said first service processor.

8. The wireless network gateway as set forth in claim 7 wherein said first switch module forwards said subsequent registration request message to said first service processor.

9. A telecommunication network comprising:
   a wireless network wirelessly communicating with mobile stations via packet data sessions:
   a packet data network transmitting data packets between said wireless network and end-user devices associated with said packet data network;
   a wireless network gateway bidirectionally transmitting data between said wireless network and said packet data network, said wireless network gateway comprising:
      N input-output processors receiving data packets from, and transmitting data packets to, said wireless network and said packet data network;
      M service processors performing packet data serving node (PDSN) functions associated with data sessions between said packet data network and mobile stations communicating with said wireless network;
      a switch fabric bidirectionally coupling said N input-output processors and said M service processors; and
      P switch modules, each of said P switch modules bidirectionally transferring data packets between said switch fabric and at least one of said N input-output processors, wherein a first one of said P switch modules stores session bindings information associated with a first data session between a first mobile station and said packet data network.

10. The telecommunication network as set forth in claim 9 wherein, in response to a failure of a first service processor performing PDSN functions associated with said first data session, said first switch module uses said stored session bindings information to configure a second service processor to continue to perform said PSDN functions associated with said first data session.

11. The telecommunication network as set forth in claim 10 wherein said first switch module transfers data packets between said switch fabric and a first input-output processor that receives data packets from, and transmits data packets to, said first mobile station.

12. The telecommunication network as set forth in claim 11 wherein said first switch module receives from said wireless network an initial registration request message associated with said first mobile station requesting to initiate said first data session.

13. The telecommunication network as set forth in claim 12 wherein said first switch module, in response to said initial registration request message, transmits to said wireless network a registration reply message denying said initial registration request message requesting to initiate said first data session.

14. The telecommunication network as set forth in claim 13 wherein said first switch module further transmits to said wireless network an address of said first service processor performing said PDSN functions associated with said first data session.

15. The telecommunication network as set forth in claim 14 wherein said first switch module receives from said wireless network a subsequent registration request message associated with said first mobile station directed to said first service processor requesting to initiate said first data session with said first service processor.

16. The telecommunication network as set forth in claim 15 wherein said first switch module forwards said subsequent registration request message to said first service processor.

17. For use in a wireless network gateway bidirectionally transmitting data between a wireless network and a packet data network associated with the wireless network, a method of operating the wireless network gateway comprising the steps of:
in N input-output processors, receiving data packets from, and transmitting data packets to, the wireless network and the packet data network;
in M service processors, performing packet data serving node (PDSN) functions associated with data sessions between the packet data network and mobile stations communicating with the wireless network;
in P switch modules, bidirectionally transferring data packets between a switch fabric and at least one of the N input-output processors, wherein a first one of the P switch modules stores session bindings information associated with a first data session between a first mobile station and the packet data network.

18. The method as set forth in claim 17 further comprising the step, in response to a failure of a first service processor performing PDSN functions associated with the first data session, of using the stored session bindings information in the first switch module to configure a second service processor to continue to perform the PSDN functions associated with the first data session.

19. The method as set forth in claim 18 further comprising the step in the first switch module of transferring data packets between the switch fabric and a first input-output processor that receives data packets from, and transmits data packets to, the first mobile station.

20. The method as set forth in claim 19 further comprising the step in the first switch module of receiving from the wireless network an initial registration request message associated with the first mobile station requesting to initiate the first data session.

21. The method as set forth in claim 20 further comprising the step in the first switch module, in response to the initial registration request message, of transmitting to the wireless network a registration reply message denying the initial registration request message requesting to initiate the first data session.

22. The method as set forth in claim 21 further comprising the step in the first switch module of transmitting to the wireless network an address of the first service processor performing the PDSN functions associated with the first data session.

23. The method as set forth in claim 22 further comprising the step in the first switch module of receiving from the wireless network a subsequent registration request message associated with the first mobile station directed to the first service processor requesting to initiate the first data session with the first service processor.

24. The method as set forth in claim 23 further comprising the step in the first switch module of forwarding the subsequent registration request message to the first service processor.

* * * * *